United States Patent
Reed et al.

(10) Patent No.: US 9,607,324 B1
(45) Date of Patent: Mar. 28, 2017

(54) TOPICAL TRUST NETWORK

(75) Inventors: Mark William Reed, Fort Thomas, KY (US); Sundaresan Ramachandran Kadayam, Blue Ash, OH (US)

(73) Assignee: Zakta, LLC, Cincinnati, OH (US)

(*) Notice: Subject to any disclaimer, the term of this patent is extended or adjusted under 35 U.S.C. 154(b) by 1067 days.

(21) Appl. No.: 12/692,179

(22) Filed: Jan. 22, 2010

Related U.S. Application Data

(63) Continuation-in-part of application No. 12/692,117, filed on Jan. 22, 2010.

(60) Provisional application No. 61/146,999, filed on Jan. 23, 2009.

(51) Int. Cl.
*G06Q 30/02* (2012.01)

(52) U.S. Cl.
CPC .................. *G06Q 30/0282* (2013.01)

(58) Field of Classification Search
CPC ... G06Q 30/02; G06Q 50/12; G06F 17/30867
USPC .............. 707/732, 783; 1/732, 783
See application file for complete search history.

(56) References Cited

U.S. PATENT DOCUMENTS

| | | | |
|---|---|---|---|
| 7,069,308 B2 | 6/2006 | Abrams | |
| 7,188,153 B2 | 3/2007 | Lunt et al. | |
| 7,451,161 B2 | 11/2008 | Zhu et al. | |
| 7,957,985 B2* | 6/2011 | Kashani et al. | 705/3 |
| 2006/0064431 A1* | 3/2006 | Kishore et al. | 707/102 |
| 2007/0143281 A1* | 6/2007 | Smirin et al. | 707/5 |
| 2008/0275719 A1* | 11/2008 | Davis et al. | 705/1 |
| 2009/0271212 A1* | 10/2009 | Savjani et al. | 705/1 |
| 2010/0161600 A1* | 6/2010 | Higgins et al. | 707/736 |

OTHER PUBLICATIONS www.myspace.com—Website of social networking owned by News Corporation. Viewed Apr. 8, 2010.
www.facebook.com—Website of social networking owned by Facebook, Inc. Viewed on Apr. 8, 2010.
www.linkedin.com—Website of business-oriented social networking. Viewed on Apr. 8, 2010.

* cited by examiner

*Primary Examiner* — Marc Somers
*Assistant Examiner* — Soheila Davanlou
(74) *Attorney, Agent, or Firm* — Frost Brown Todd LLC

(57) ABSTRACT

Methods, systems, devices and/or apparatus related to type of network-based social network in which network "connections" are include a topical trust factor between users, so that reputable information available over the network my be provided. In an example embodiment, a social rank score for available items of information is provided that allows the system to rank available information based upon topical factors associated with such information.

18 Claims, 7 Drawing Sheets

TOPICAL TRUST NETWORK

CROSS REFERENCE TO RELATED APPLICATIONS

This application claims the benefit of U.S. Provisional Patent Application Ser. No. 61/146,999, entitled "Topical Trust Network", filed on Jan. 23, 2009, and is also a continuation-in-part of co-pending U.S. Non-Provisional patent application Ser. No. 12/692,117, entitled "Topical Search Portal", filed on Jan. 22, 2010, the disclosure of each of which is incorporated herein by reference.

BACKGROUND

The Internet has become a primary repository of knowledge, but there are still many challenges in finding reputable information. Search engines have made it much easier to find information, but one challenge involves how to distinguish between reputable and disreputable information.

One way to find reputable information is to enlist the help of others who are knowledgeable about the subject. However, this has traditionally been a manual process which involved either researching the opinions of experts or reaching out to friends and colleagues. This process has been streamlined by the content rich websites, which support the research, process and social networking websites, which allow people to more easily interact with friends and colleagues. However, it continues to be a lengthy manual process.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

Figure 1:
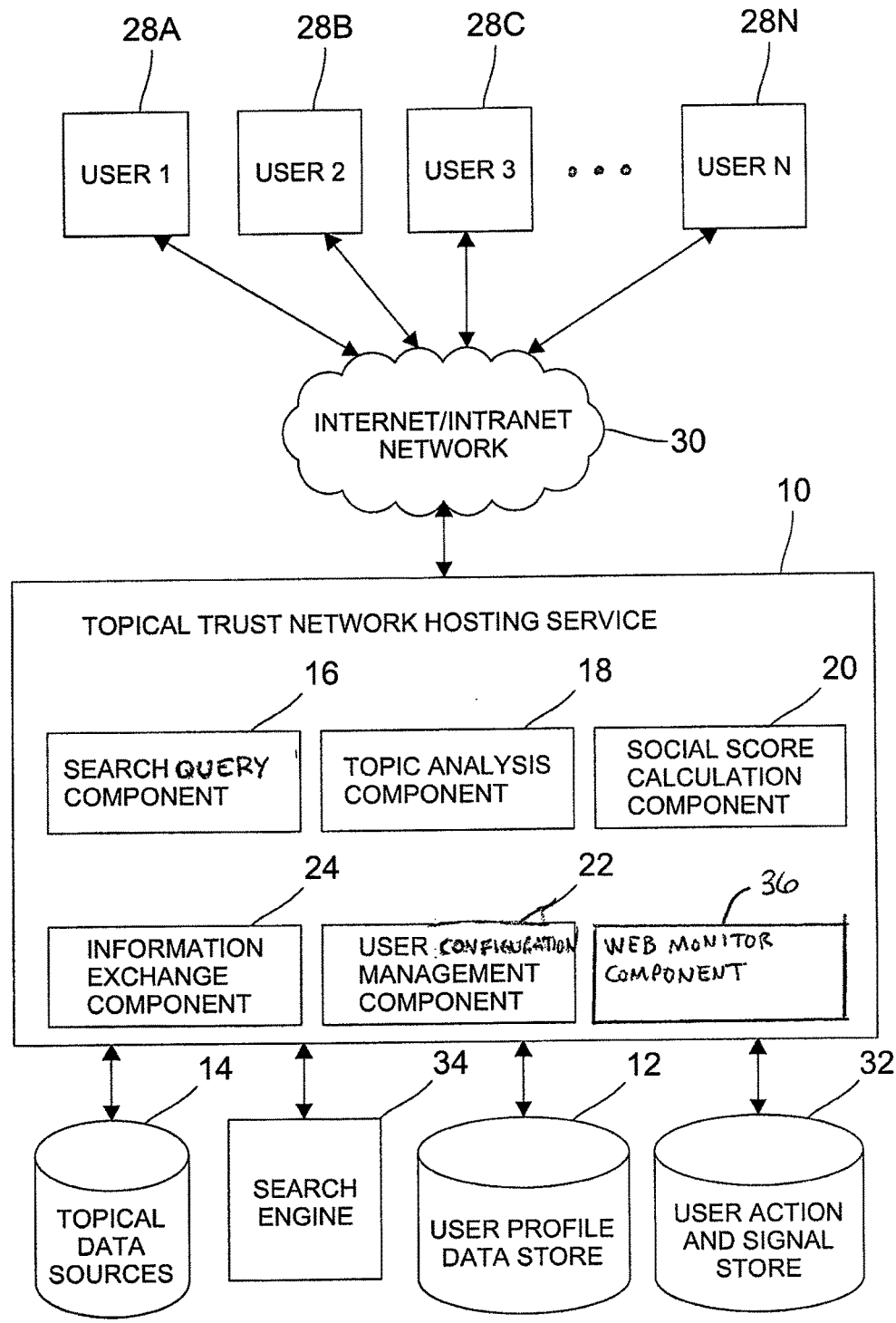
FIG. 1 is a diagram depicting an example embodiment of the invention.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

This disclosure is drawn to methods, systems, devices and/or apparatus related to finding and sharing information on a large-scale or global computer network such as the Internet. Specifically, the disclosed methods, systems, devices and/or apparatus relate to allow for the automated use of other people's opinions about information on the Internet. Disclosed embodiments provide for a topical trust network, which is a unique kind of network-based (e.g., Internet-based) social network service that allows people to establish rich trust relationships with others based on their expertise, and automatically benefit from their knowledge when searching and sharing information on the Internet. This topical trust network can be used to derive a social rank for accessible information that can be used to distinguish between reputable and disreputable information. For purposes of the present disclosure, the topical trust network is a type of social network service. As well known to those of ordinary skill, a social network service generally comprises a number of users who interact with the service utilizing computer-based graphical user interfaces (e.g., Web browsers) operatively coupled to the network (e.g., the Internet).

A social network service generally includes profile information for each user, the user's social links/connections (e.g., the identity and other information of other users of the social network service to whom the users agree to share at least some information), and perhaps a variety of additional services. Generally, a social network hosting service is a web hosting service that specifically hosts the user creation of web-based social networking services, alongside related applications. Exemplary topical trust networks disclosed herein are similar to social network services that are hosted, for example, on a social network hosting service. But as will be described herein, exemplary topical trust networks may be more flexible than traditional social networks; for example, because exemplary topical trust networks also allow for one-way connections, where only one of the two users has agreed to or initiated the connection to receive information from the other user. Other differences from traditional social networks will also be apparent from the present disclosure.

The example topical trust network as disclosed herein allows for a number of unique aspects.

1) A topical trust network allows for "connections" which are broader in scope than those traditionally used in social networks. A topical trust connection can represent anything from a very loose connection of limited scope to the tight connection of the traditional "friends" concept on social networks. While traditional social network connections are social links between users, topical trust connections are topic-based links between users. It could be a single network link between users that indicates one or more topics of trust, or it could multiple links between users, one for each topic of trust between the users.

2) A topical trust network allows for social connections to experts without a personal relationship. Traditional social networks require both parties to agree to be a "friend". A topical trust connection can be one way (i.e. not require reciprocity).

3) A topical trust connection can include the subject area of trust. A user may choose to have the connection to apply to all topics (e.g. a traditional "friend") or choose to only have it apply to a limited number of topics.

4) A topical trust connection can include a trust factor. This trust factor represents the strength of a connection rather than considering all connections as the same strength like traditional social networks.

5) A topical trust network allows for implicit connections. Traditional social networks only have explicit connections chosen by the user. Since, in the example embodiments, connections can be implied based on expertise, implicit connections can occur when there is an interaction between two people but no explicit choice to establish a permanent connection.

A topical trust network can be used in a number of ways to help with search and discovery of information on the Internet. A topical trust network can be used in search to create a differentiated social-rank method for organizing search results. The social information derived from the trust network can help distinguish between reputable and disreputable information and present better, more trusted search results.

A topical trust network can be used for the discovery of reputable and reliable information on a topic over the Internet or some other computer or electronic data network. Topically relevant information discovered by users can be smartly and efficiently passed to members of their trust network. The topical trust network can also be used to discover other topically knowledgeable people in which to connect and further build the topical trust network, and can be used to discover network accessible resources (external topical data sources, identities of other knowledgeable people) known by other topically knowledgeable people as is described further below.

In an example embodiment (as depicted in FIG. 1), a system 10, such as a topical trust network hosting service, for exchanging information using a topical trust network is provided. Such a system 10 may include or have access to a plurality of user profiles in one or more user profile database(s) 12. Such a system 10 may be linked to and/or be in communication with topical data source(s) 14. Topical data source(s) 14 may store and/or link to structured information from numerous sources. Online encyclopedias, government (public) databases and United Nations databases may provide structured topical information. Systems such as WordNet or OpenCyc may provide structured conceptual information. Resources such as the Central Intelligence Agency (CIA) World Factbook may provide structured locational information. Sources like Epinions.com or Amazon.com may provide structured shopping information. The system 10 may include a search query component 16, a topical analysis component 18, a social score calculation component 20, a user configuration management component 22, an information exchange component 24 and/or a Web monitor component 36.

The search query component 16 may be configured to receive a search query. The topical analysis component 18 may be configured to relate a topical area to the search query based, at least in part, on the structured information in the topical data source(s) 14. The social score calculation component 20, as will be discussed in detail below, generates topical trust scores for potential data exchange providers on the topical trust network. The user configuration management component 22 facilitates the set-up and management of user page(s) in the network utilizing applications and resources as is well known in the art. The information exchange component 24 facilitates the exchange of and/or access to topical information (topical according to a topical analysis of the search query) from selected users (selected based upon the results of the social score calculation component) on the topical trust network to the requesting user(s). Topical trust network users 28A, 28B, 28C-28N, may interact with the system 10 through a communication network 30 such as the Internet, an Intranet or other similar network. The system 10 may also utilize a user action and signal database 32 as will be discussed below; and may also interact with available search engine sites and technologies 34.

The Web monitor component may be used by the system 10 to monitor for and harvest external social signals over the Web or some other network. Such external signals can include, without limitation, Web Inlinks, Blog Inlinks, Authority Recos, Visits and Social Bookmarks. They could come from sites such as blogs, social bookmarking sites (like Digg™ or StumbleUpon™), social networking sites (like Facebook™ or Twitter™) or generic Websites. They could be gathered via APIs and feeds (where the exchange sites provide them) or through direct spidering of Web pages. Implied trust factors (accounting for the fact that these signals have been harvested externally), as described herein, may be automatically applied to such external signals to help rank such external signals with other signals.

Figure 2:
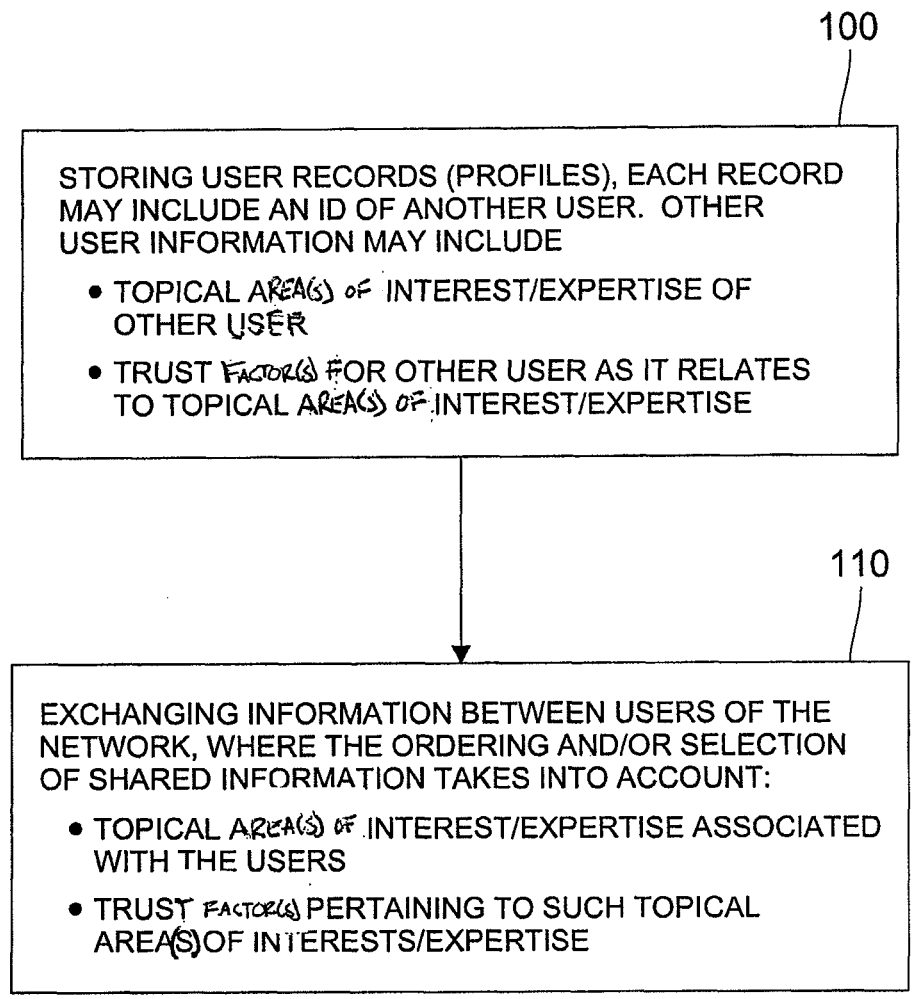
FIG. 2 is a flow diagram depicting an example embodiment of the invention.
Figure 7:
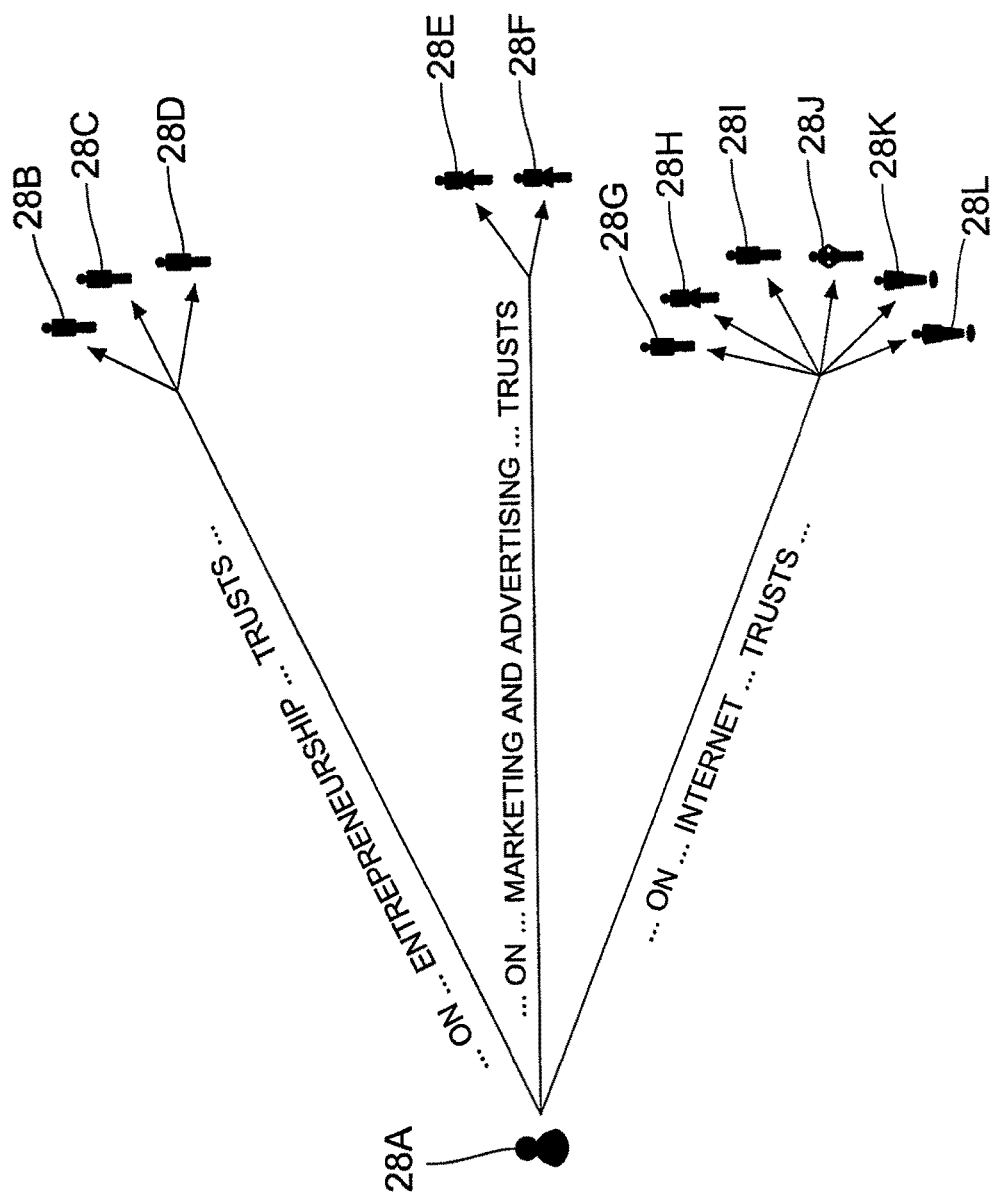
FIG. 7 is a graphical representation of topical trust network connections according to an embodiment of the invention.

As depicted in FIG. 2, a method for exchanging information in an example topical trust network is provided. Such a method may include processing operations 100 and 110. Beginning at operation 100, user records containing information respectively pertaining to a plurality of users (28A-28N) may be stored on one or more network accessible servers (in data stores 12, for example). Such user records may include typical social network information regarding each respective user, and may also include identification information of another user (28A-28N) in which the respective is associated. Such identification information may be in the form of a social network "connection." In an exemplary embodiment, such connection information may also include an identification of one or more topical areas of interest or expertise of such other user, and may include a trust factor pertaining to each area of interest/expertise. Such a trust factor may relate to the level of trust that the owner of the user record may have with the other user as it pertains to such area of interest/expertise. In such a manner, a topical trust network may be built, where, as shown in FIG. 7, a first user 28A may have established topical trust factors with a plurality of other users 28B-28L established in the first user's profile record stored in data store 12. With respect to other users 28B, 28C and 28D, the first user 28A has a trust factor associated with each in the user's profile record on the topic of "Entrepreneurship." Likewise with other users 28E and 28F, the first user 28A has a trust factor associated therewith on the topic of "Marketing and Advertising." And with other users 28G through 28L, the first user 28A has a trust factor associated therewith on the topic of "Internet." Referring back to FIG. 2 a subsequent operation 110 in the process may include the exchanging of information between users of the network, where the ordering and/or selection of such shared information takes into account (a) topical areas of interest/expertise associated with the users; and (b) trust factors pertaining to such topical areas of interest/expertise.

In an example embodiment, each user has a profile record that includes, and is certainly not limited to, information with respect to the user's connections with other users (one connection per other user), and then for each connection with another user, the profile further includes trust factors established for such other connected users. For example, if User A has a connection with User B and has three trust factors established with User B, User A's record will include information reflecting the connection with User B and the three trust factors established with User B will correspond to that connection information.

The trust factor could be merely a binary "yes" or "no" type indication (yes, I trust this user on this topic, or no), or the trust factor could be a weighted scale providing various levels of trust. For example, when manually assigning a trust factor to another user, a first user may utilize a drop-down menu providing varying levels of trust for the other user on a given topic (such as identifying the other user as "Expert," "Very Knowledgeable," "Somewhat Knowledgeable" and so forth), where the system may assign a numerical trust factor to the other user based upon the first user's selection.

The user's record may also include information pertaining to an identification of one or more topical areas of interest/expertise for itself. And the user's record may also include, provide and/or link to information categorized under that area of interest/expertise for sharing with other users on the system. The user's record may also include information identifying other users who trust him or her on such topical areas of interest/expertise and may also include a trust factor associated therewith.

With respect to operation 110 and the exchanging of information between users, this process could merely involve the exchange of identities of users who may be experts in requested topical areas. Such information could be the identity of a second user in which a first user has a topical trust factor already established or could be the identity of other users in which the second user has established topical trust factors.

Figure 3:
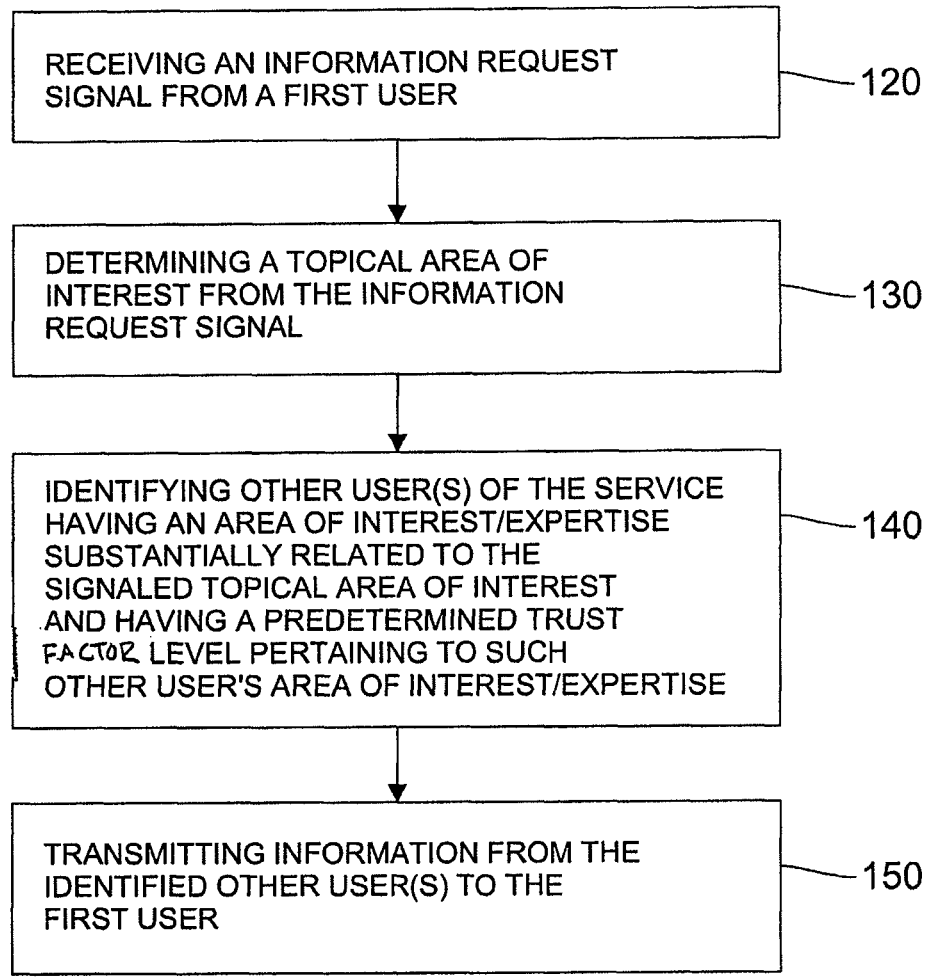
FIG. 3 is a flow diagram depicting an example embodiment of the invention.

As depicted in FIG. 3, an example process for exchanging information in an example topical trust network is further described. Such steps may include processing operations 120, 130, 140 and 150. Operation 120 may include the receiving of an information request signal from a first user in the topical trust network. This may be the result of the first user initiating a search query, or may be a more direct and focused informational request (such as by clicking on a hyperlink in a topical category, such as "Cancun Hotels") as known in the field. Operation 130 may include a step of determining a topical area of interest from the information request signal as described below. Operation 140 may involve identifying other user(s) of the service having an area of interest/expertise substantially related (or related in any predefined manner) to the signaled topical area of interest, and having a predetermined trust factor level pertaining to such other user's area of interest/expertise. Operation 150 may involve transmitting information from the identified other user(s) in operation 140 to the first user.

With respect to operations 120 and 130, in some examples, a user may enter a search query in operation 120. This search query may be analyzed (in operation 130) by using available language processing software and mapped to a topical area. Such mapping may be done in any of several ways. One method may be a direct lookup of one or more words and/or phrases in the search query against a database of topics. Another method may be the user of a full text index with fielded data using the Lucene software library and a topical scoring algorithm. However, other methods may also be used to deal with variance in language. For the purposes of the present disclosure any known information retrieval algorithm or process may be utilized.

In an example embodiment, an index of encyclopedic information may be used to derive a relevance score. The relevance score may be generated based on a number of factors including traditional tf-idf scoring and then factoring on custom scoring which gives added weight to important structure fields such as the topic name as well as phrase matches. If a highly relevant topic is identified, the highest scoring topic may be chosen as the topical area. Other methods such as a statistical classifier may be used.

Figure 4:
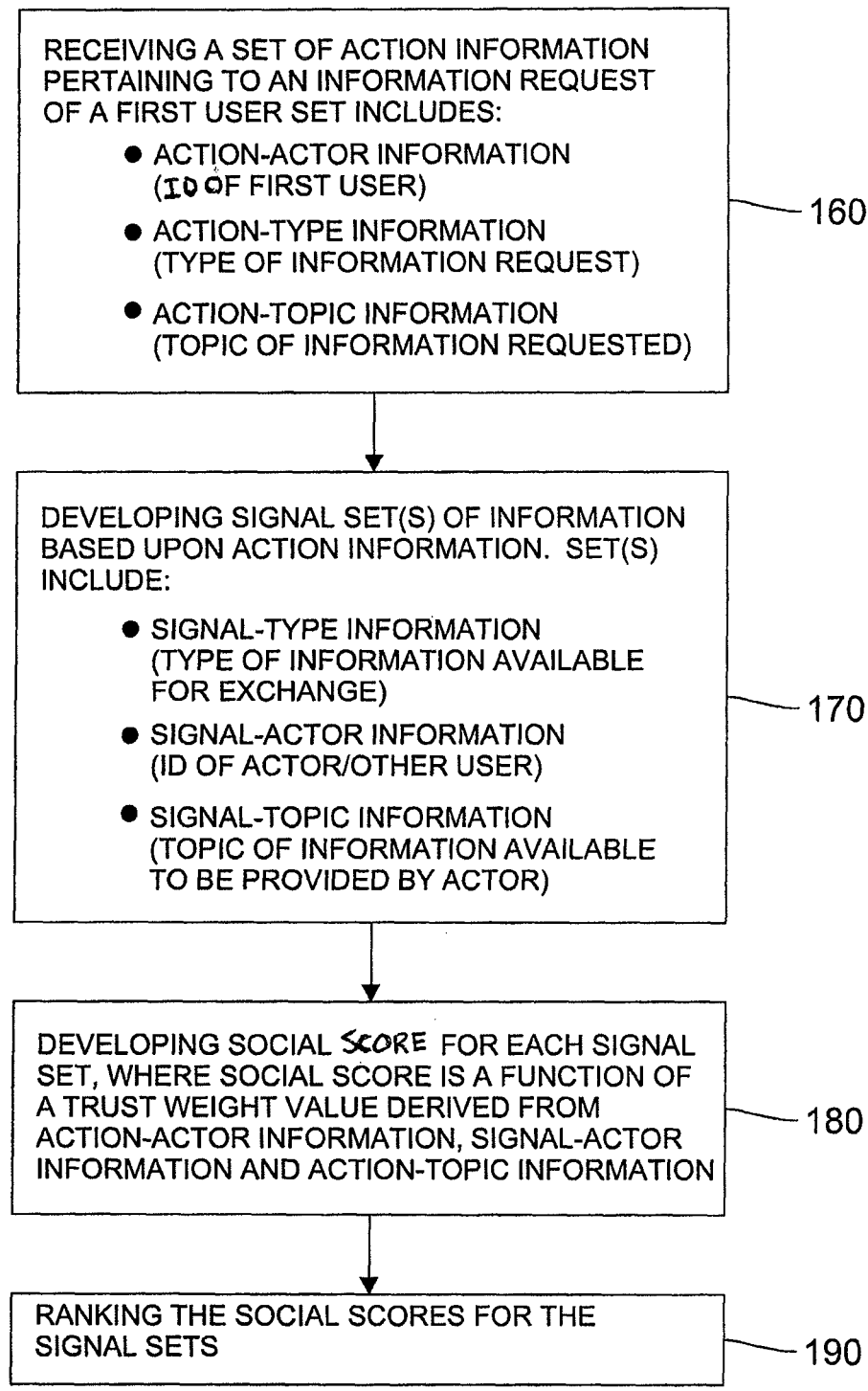
FIG. 4 is a flow diagram depicting an example embodiment of the invention.

As depicted in FIG. 4, an alternative example process for exchanging information in an example topical trust network is further described. Such steps may include processing operations 160, 170, 180 and 190. Operation 160 may include receiving a set of action information pertaining to an information request of a first user; where the set of action information may include: action-actor information (identity information pertaining to the first user), action-type information (pertaining to the type of information request), and action-topic information (pertaining to the topic of information requested). Operation 170 may include developing signal set(s) of information based upon the action information set, where each signal set of information may include: signal-type information (pertaining to the type of information available for exchange); signal-actor information (pertaining to the identity of the user/actor having the information available for exchange); and signal-topic information (pertaining to the topic of information available for exchange by the user/actor). Operation 180 may include developing a social score for each signal set, where the social score is a function of a trust weight value derived from the action-actor information, signal-actor information and the action-topic information. A detailed example process for developing such a social score is discussed in further detail below. Process 190 may involve ranking the social scores for the signal sets. Based upon the ranking process 190, some or all of the available information may be transmitted to the first user from the other users/actors.

In an example embodiment, a social score calculation component 20 can generate a social rank score, which can be used to distinguish between reputable and disreputable information.

One exemplary process for calculating a social rank score for various sources of requested information utilizes three primary data constructs:
Connection—social link between two people
    ConnectionFrom
    ConnectionTo
    ConnectionTopic(s)
    ConnectionTrustFactor(s)
Signal—social signal
    SignalType
    SignalActor
    SignalTopic
    SignalItem
Action—action taken for which social rank is desired
    ActionType
    ActionActor
    ActionTopic
    ActionItem The example system utilizes a database of connections and signals. These connections and signals are either created explicitly by users over time or bootstrapped from existing systems.

When joining the system, a user may provide details about interests and expertise as well as information about people they trust in topical areas. Furthermore, users can continually expand this information through both explicit and implicit actions. For example, when a user discovers an expert on a topic, they may add that person to their topical trust network.

Connections may include information about people trusted, the topics for which they are trusted, and the strength of that trust. They can be created explicitly by the user of the system or implied from existing derived information (such as who are experts in certain subject areas). Connections may be bi-directional as in traditional social networks, or may be one-way as described herein.

Signals represent actions taken by others which may be relevant in determining reputable information. Signals include the person responsible, the type of signal, the topical area, and the item involved. These may be direct actions within the topical trust network or implied information derived from other Internet sources.

Each construct includes topical information. Topical information may be defined in several ways. In an example embodiment, topical areas are defined in two ways. All items are mapped into a predefined comprehensive set of major topical areas such as Photography or Philosophy. Furthermore, user specified tags can be included to further define topical areas.

With these constructs in place, the following algorithm can be applied to derive social rank.

1) A user takes an action. For example, say user1 runs a search on "George Bush". The Action data set could be as follows:
   Action
      ActionType=Search
      ActionActor=user1
      ActionTopic=Politics
      Action Item=George Bush 2) From the ActionType, the system builds a collection of candidate signals (only certain SignalTypes are relevant for a given ActionType). For example, it might find the following signals by looking for those of type "collection" to satisfy a search.
   Signal
      SignalType=Collection
      SignalActor=user2
      SignalTopic=Politics
      SignalItem=George W. Bush
   Signal
      SignalType=Collection
      SignalActor=user3
      SignalTopic=Government
      SignalItem=President
   Signal
      SignalType=Collection
      SignalActor=user2
      SignalTopic=Sports
      SignalItem=Golf 3) The system can then process each signal to get a social score
   social score=weight(SignalType)*
   trust(ActionActor,SignalActor,ActionTopic)*
   similarity(ActionTopic,SignalTopic)*
   similarity(Actionitem,SignalItem);
   where,
     "weight(SignalType)" is a social weight defined for a given type. For instance, an explicit rave by a user might have a higher weight than a comment;
     "trust(ActionActor,SignalActor,ActionTopic)" is a trust factor from ActionActor to SignalActor in the given topical area. The higher the trust, higher the factor. For instance, user1 might trust user2 more than user3 in the Politics topic;
     "similarity(ActionTopic,SignalTopic)" is the relative similarity between ActionTopic and SignalTopic. The closer the topics, the higher the similarity. For instance, Politics would have a higher similarity with Politics than Government;
     similarity(Actionitem,SignalItem) is the similarity between ActionItem and SignalItem. The closer the items, the higher the similarity. For instance, "George Bush" might have a higher similarity with "George W. Bush" than "President";

4) Once the example system has developed a score on each signal, it sorts them by score to get social rank. For instance, the highest scoring signal would have a rank of 1, etc. Each of the components of the score could use different algorithms. Over time, these could become richer and more complex. An initial set of algorithms could be the following:
   weight(SignalType)—simple mapping of SignalType to weight
   trust(ActionActor,SignalActor,ActionTopic)—If connection is bidirectional with no topic restriction, produce the highest trust factor. If the connection is one way with no topic restriction, produce the next highest factor. If connection is topical, use similarity(ActionTopic,ConnectionTopic). If no connection, return default trust factor. The optimal numeric values for each factor level can be determined through testing.
   similarity(ActionTopic,SignalTopic)—topics are limited to closed set from subject taxonomy. If topic matches, return high similarity. Otherwise, return default similarity. The optimal numeric values for similarity can be determined through testing.
   similarity(Actionitem,SignalItem)—If items match exactly, high similarity is returned. If they don't match exactly, items are broken into smaller parts. For instance, a URL is broken into its host and path. A query is broken into its keywords. If some parts match, medium similarity is used. Otherwise, use default similarity. The optimal numeric values for similarity can be determined through testing.

Subsequent improvements could include the following
   trust(ActionActor,SignalActor,ActionTopic)—trust factor could be a statistical aggregation of all social signals directly or indirectly between ActionActor and SignalActor considering the ActionTopic. For example, if User A does not have a trust factor for User B for a certain topic, but User B is trusted by others in the topical trust network for the topic, then the trust factor could take into account the an aggregation of such other trust factors (indirect social signals) for User B on such topic.
   similarity(ActionTopic,SignalTopic)—free form topics could be allowed and a statistical similarity algorithm would be used. This could include statistical classifiers to map open topics into taxonomies (perhaps based on encyclopedic knowledge). Furthermore, it might involve mapping the topics into multiple taxonomies in N dimensional space and then using vector proximity. This would allow similarity to consider multiple aspects of a topic (e.g. George Bush is a President, a Person, etc)
   similarity(Actionitem,SignalItem)—weighted similarity could measure the similarity in richer ways. For instance, it could consider the similarity of text between the items or recognize synonyms and related terms.

With respect to ActionTypes and SignalTypes, almost any action by a user can have an ActionType and almost any action by some other user can be a SignalType. Some common SignalTypes could include contributions and micro-contributions by other users. For example, a user might contribute a collection of items (such as a "guide") on a topic. Also, a signal might be a social micro-contribution, such as comments and recommendations, which can be passed along to others based on the topical trust network. Some additional examples of common signals may include: (a) Comment Signal—a user may make a comment on an item in an example embodiment (e.g., a "guide") in the topical trust network system or on some other social network system or some other site (such as a blog); (b) Recommend Signal—a user may recommend an item within the topical trust network system or on some other social network system or some other site (such as TripAdvisor™); and (c) Contribute Signal—a user may contribute an item within the topical trust network system or on some other social network system or some other site (such as a bookmarking site such as Digg™ or StumbleUpon™). By matching Actions with candidate Signals and applying topical trust weighing, relevant Signals can be brought to the attention of the user/ actor taking an Action. Signal types may also be the identity of knowledgeable people or experts related to a particular topic.

With respect to the trust functions and the range of values for the "strength" of a user's trust of another user, one example would use a numerical scale corresponding to the amount of trust; such as using decimal numbers between 0 and 1, with 1 representing complete trust. This might be described to the users in textual terms and then mapped to corresponding numeric values. For example, in a drop down menu, "Expert" could be 1, "Very Knowledgeable" could be 0.5, "Somewhat Knowledgeable" could be 0.25. Such trust factors could be considered as examples of explicitly defined trust factors.

Implicit trust factors or factors could be derived in multiple ways. For example, if a user routinely recommends another user's items in a topic, such recommendations represent an implicit trust of that person on that topic. Similarly, implicit trust may come from indirect sources. For example, if User 1 strongly trusts User 2 on a topic and User 2 strongly trusts User 3 on that same topic, then an implied trust factor can be derived between User 1 and User 3. The trust function algorithms can utilize rule based algorithms and/or statistical algorithms. Rule based algorithms may evaluate whether the connection between users is a direct connection, whether the connection is bi-directional, and whether the trust between the users is topically limited, for example. A statistical algorithm may be used to measure implicit trust factors, for example. For instance, if a user fully trusts another user on a topic, such as "Basketball," the trust factor for such other user on such topic could be assigned a 1.0 value. But for other sports information other than Basketball, statistical algorithms may be used to approximate a trust factor for such other sports information where such implicit trust scores may be relatively higher on other sports information as compared to an entirely unrelated topic (based upon semantic similarity of topics). In an embodiment, the trust factor can include a consideration of a social graph where all direct connections are considered as well as indirect connections (friend of a friend). A trust factor could be computed for each pair of users, weighted by the strength of their relationship, and then aggregated in a composite score. As will be appreciated, a trust factor need not be a numerical value in every embodiment.

With respect to the similarity functions, known semantic similarity algorithms may be utilized. In an example embodiment, the items being compared may be assigned a metric based on the likeness of their meaning and/or semantic content. For example, "Polictics" would have a higher similarity with "Politics" than "Government," and "George Bush" might have a higher similarity with "George W. Busch" than "President." Example embodiments can also utilize rule based systems. For example, when comparing the similarity of two items, a URL is broken into its host and path. A query is broken into its key words. If some parts match, medium similarity is used, which reflects structural knowledge about the URLs and a rule based system on similarity.

Further optimizations may be implemented in some embodiments to enable the process to render real time results. These would involve the typical techniques used to improve speed such as using custom data structures for efficient data storage and caching whatever information is possible.

For instance, a sparse matrix could be pre-generated with all signals mapped by their Topic/Item combinations. This would allow the top candidate signals to be discovered quickly and then trust factors could be overlaid to get a resulting social score. A sparse matrix data structure would allow for a huge matrix of data to be stored in a memory efficient way that would allow huge amounts of data to be in memory. Furthermore, hash codes could be used to represent items to allow for efficient storage.

Figure 5:
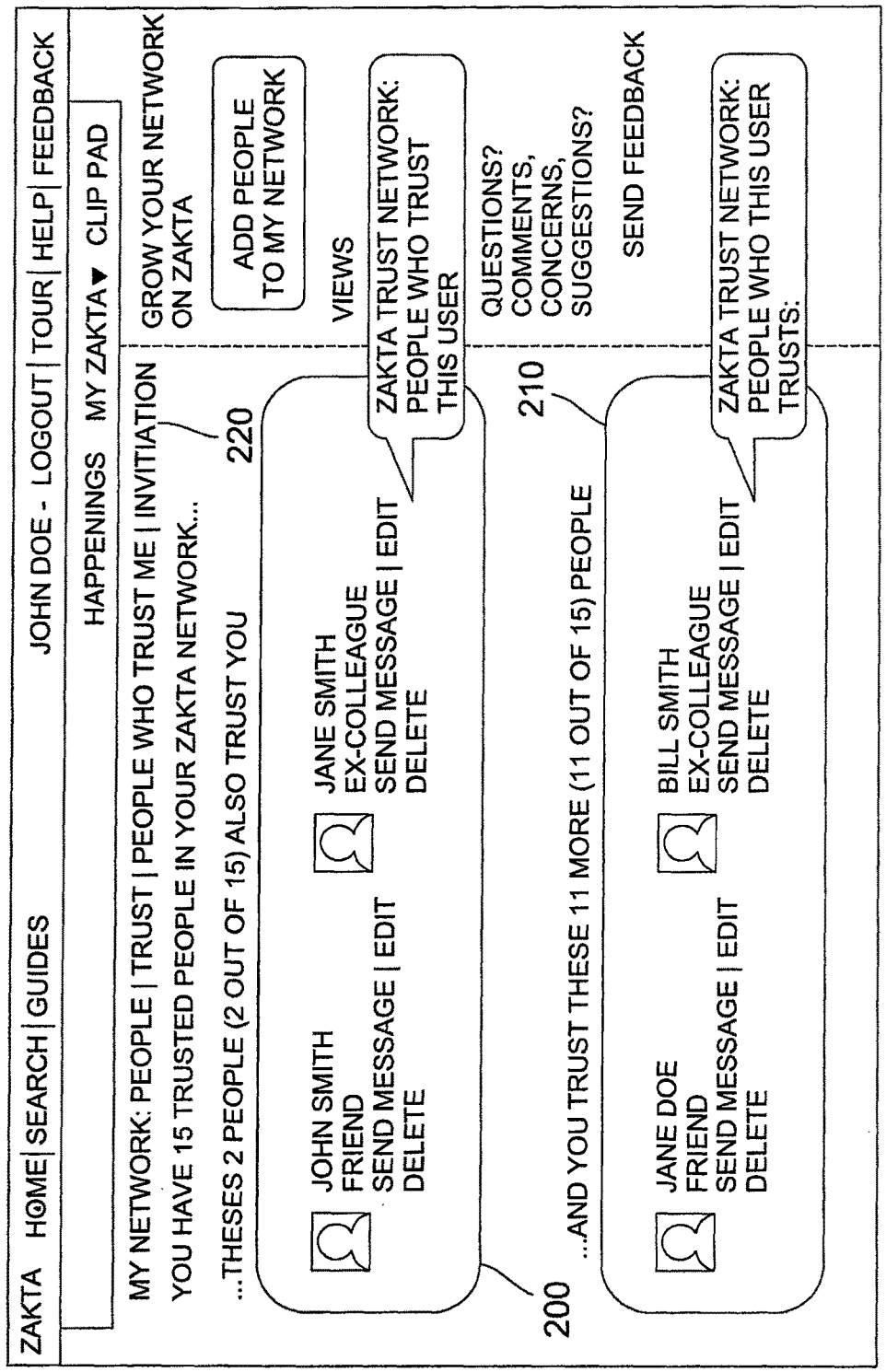
FIG. 5 is a diagram depicting an interface of an example embodiment of the invention.
Figure 6:
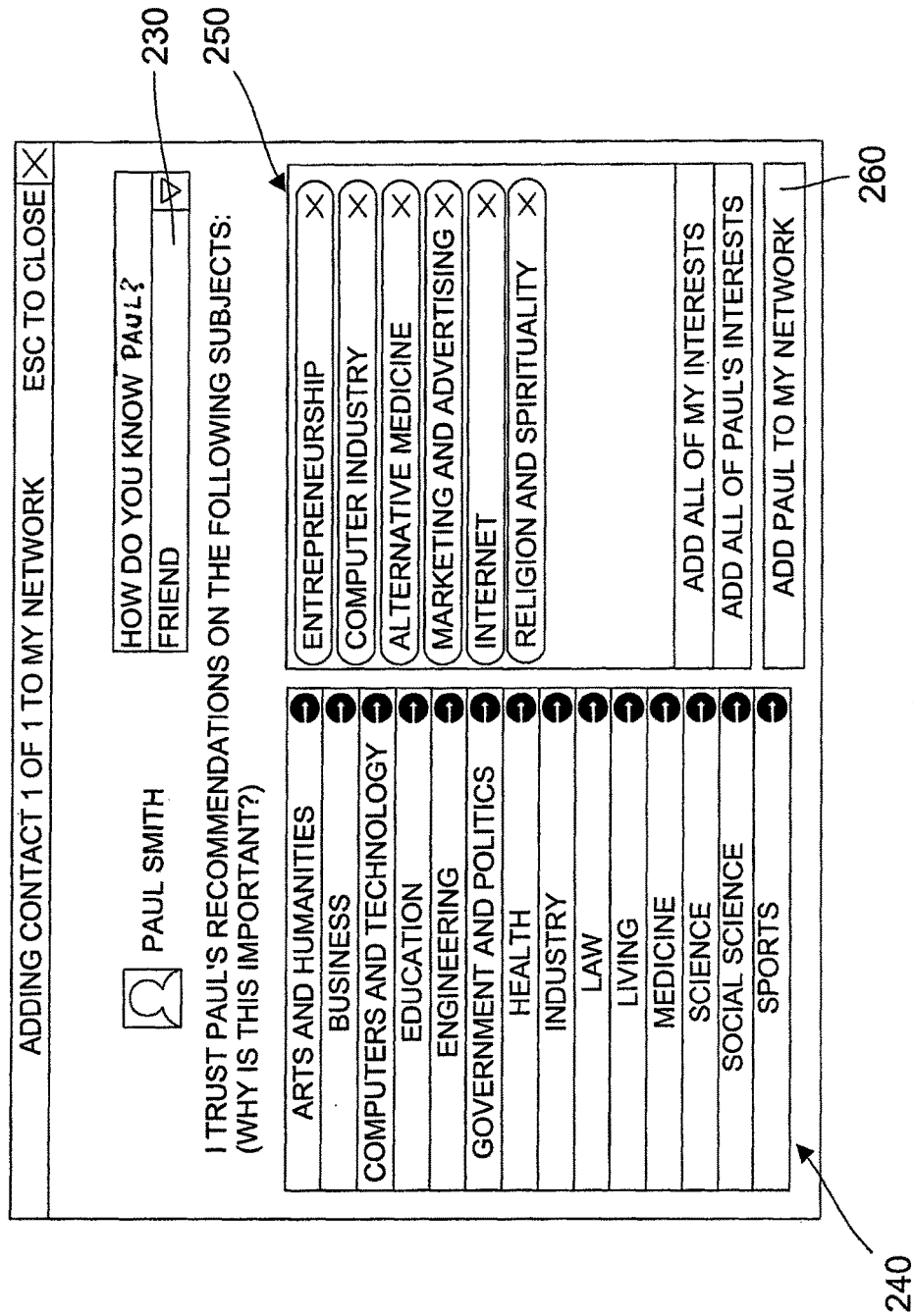
FIG. 6 is a diagram depicting an interface of an example embodiment of the invention.

In yet another example embodiment (as depicted in FIGS. 5 and 6), example graphical and interactive interfaces for the system 10 for setting up and/or utilizing the topical trust network are provided. FIG. 5 is a screen-shot representation of a "my network" page for a given user where the page presents information of other users on the network who trust the given user for topical information as shown in field 200 and presents information of other users on the network who the given user trusts for topical information as shown in field 210. Hyperlink "Invitations" 220 will take the user to another screen in which the user can invite other users to the user's topical trust network. FIG. 6 is a screen-shot representation of an "adding contact" screen for a given user, which may be reached in the process of inviting other users to the user's topical trust network. As shown in FIG. 6, a first field 230 provide a pull-down menu to have the user identify how it knows the contact/other-user. A hierarchical category/ subcategory menu 240 allows the user to select categories, such as "Business" or "Education" and then select subcategories, such as "Entrepreneurship" or "Internet" under such categories for identifying topical areas of trust for the other contact/other user. Such selected topical areas of trust will be shown in field 250. Button 260 can then be activated to start the process of adding the contact/other user to the user's topical trust network.

To provide additional context for various aspects of the present invention, the following discussion is intended to provide a brief, general description of a suitable computing environment in which the various aspects of the invention may be implemented. While one embodiment of the invention relates to the general context of computer-executable instructions that may run on one or more computers, those skilled in the art will recognize that the invention also may be implemented in combination with other program modules and/or as a combination of hardware and software.

Generally, program modules include routines, programs, components, data structures, etc., that perform particular tasks or implement particular abstract data types. Moreover, those skilled in the art will appreciate that aspects of the inventive methods may be practiced with other computer system configurations, including single-processor or multi-processor computer systems, minicomputers, mainframe computers, as well as personal computers, hand-held wireless computing devices, microprocessor-based or programmable consumer electronics, and the like, each of which can be operatively coupled to one or more associated devices. Aspects of the invention may also be practiced in distributed computing environments where certain tasks are performed by remote processing devices that are linked through a communications network. In a distributed computing environment, program modules may be located in both local and remote memory storage devices.

A computer may include a variety of computer readable media. Computer readable media may be any available media that can be accessed by the computer and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which may be used to store the desired information and which may be accessed by the computer.

An exemplary environment for implementing various aspects of the invention may include a computer that includes a processing unit, a system memory and a system bus. The system bus couples system components including, but not limited to, the system memory to the processing unit. The processing unit may be any of various commercially available processors. Dual microprocessors and other multi processor architectures may also be employed as the processing unit.

The system bus may be any of several types of bus structure that may further interconnect to a memory bus (with or without a memory controller), a peripheral bus, and a local bus using any of a variety of commercially available bus architectures. The system memory may include read only memory (ROM) and/or random access memory (RAM). A basic input/output system (BIOS) is stored in a non-volatile memory such as ROM, EPROM, EEPROM, which BIOS contains the basic routines that help to transfer information between elements within the computer, such as during start-up. The RAM may also include a high-speed RAM such as static RAM for caching data.

The computer may further include an internal hard disk drive (HDD) (e.g., EIDE, SATA), which internal hard disk drive may also be configured for external use in a suitable chassis, a magnetic floppy disk drive (FDD), (e.g., to read from or write to a removable diskette) and an optical disk drive, (e.g., reading a CD-ROM disk or, to read from or write to other high capacity optical media such as the DVD). The hard disk drive, magnetic disk drive and optical disk drive may be connected to the system bus by a hard disk drive interface, a magnetic disk drive interface and an optical drive interface, respectively. The interface for external drive implementations includes at least one or both of Universal Serial Bus (USB) and IEEE 1394 interface technologies.

The drives and their associated computer-readable media may provide nonvolatile storage of data, data structures, computer-executable instructions, and so forth. For the computer, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules may be stored in the drives and RAM, including an operating system, one or more application programs, other program modules and program data. All or portions of the operating system, applications, modules, and/or data may also be cached in the RAM. It is appreciated that the invention may be implemented with various commercially available operating systems or combinations of operating systems.

It is within the scope of the disclosure that a user may enter commands and information into the computer through one or more wired/wireless input devices, for example, a touch screen display, a keyboard and/or a pointing device, such as a mouse. Other input devices may include a microphone (functioning in association with appropriate language processing/recognition software as know to those of ordinary skill in the technology), an IR remote control, a joystick, a game pad, a stylus pen, or the like. These and other input devices are often connected to the processing unit through an input device interface that is coupled to the system bus, but may be connected by other interfaces, such as a parallel port, an IEEE 1394 serial port, a game port, a USB port, an IR interface, etc.

A display monitor or other type of display device may also be connected to the system bus via an interface, such as a video adapter. In addition to the monitor, a computer may include other peripheral output devices, such as speakers, printers, etc.

The computer may operate in a networked environment using logical connections via wired and/or wireless communications to one or more remote computers. The remote computer(s) may be a workstation, a server computer, a router, a personal computer, a portable computer, a personal digital assistant, a cellular device, a microprocessor-based entertainment appliance, a peer device or other common network node, and may include many or all of the elements described relative to the computer. The logical connections depicted include wired/wireless connectivity to a local area network (LAN) and/or larger networks, for example, a wide area network (WAN). Such LAN and WAN networking environments are commonplace in offices, and companies, and facilitate enterprise-wide computer networks, such as intranets, all of which may connect to a global communications network such as the Internet.

The computer may be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi (such as IEEE 802.11x (a, b, g, n, etc.)) and Bluetooth™ wireless technologies. Thus, the communication may be a predefined structure as with a conventional network or simply an ad hoc communication between at least two devices.

The system may also include one or more server(s). The server(s) may also be hardware and/or software (e.g., threads, processes, computing devices). The servers may house threads to perform transformations by employing aspects of the invention, for example. One possible communication between a client and a server may be in the form of a data packet adapted to be transmitted between two or more computer processes. The data packet may include a cookie and/or associated contextual information, for example. The system may include a communication framework (e.g., a global communication network such as the Internet) that may be employed to facilitate communications between the client(s) and the server(s).

Following from the above description and invention summaries, it should be apparent to those of ordinary skill in the art that, while the methods and apparatuses herein described constitute exemplary embodiments of the present invention, it is to be understood that the inventions contained herein are not limited to the above precise embodiment and that changes may be made without departing from the scope of the invention. Likewise, it is to be understood that it is not necessary to meet any or all of the identified advantages or objects of the invention disclosed herein in order to fall within the scope of the invention, since inherent and/or unforeseen advantages of the present invention may exist even though they may not have been explicitly discussed herein.

What is claimed is:

1. One or more non-transitory computer-readable mediums having instructions thereon, the instructions configured to operate a network accessible computer system to perform the steps of:

storing, on one or more network accessible network servers, user records containing information respectively pertaining to a plurality of users of a user network, each respective user record including at least one identification of another user in which the respective user is associated with in the user network, and including information pertaining to, an identification of two or more topical areas of interest or expertise for the other user relating to the respective user's opinion on the level of trust, selected from a list of available topical areas of interest or expertise; and for each of the two or more selected topical areas of interest, a trust factor respectively pertaining to each of the two or more selected topical areas of interest or expertise for the other user, each respective trust factor relating to the respective user's opinion on the level of trust that the respective user has with the other user with respect to each of the two or more topical areas of interest, and each trust factor being a numeric value taken from one of at least three numeric values on a weighted scale providing various levels of trust; and exchanging information over the user network between users of the user network, wherein ordering and selection of shared information on the user network between users of the user network takes into account the selected topical areas of interest or expertise of the users and the respective trust factors pertaining to the respective topical areas of interest or expertise;

wherein the step of exchanging information further includes steps of:

receiving over the user network a set of action information pertaining to a first user information request, including action-actor information pertaining to an identity the first user, action-type information pertaining to a type of information requested by the first user, and action-topic information pertaining to a topic of information requested by the user;

developing from the set of action information received from the first user one or more candidate signal sets of information representing actions taken by one or more other users, at least one of the candidate signal sets of information including, signal-type information pertaining to a type of information available for exchange from another user, signal-actor information pertaining to an identity of the other user, and signal-topic information pertaining to a topic of information available to be provided by the other user; and developing a social score pertaining to the degree of interest or expertise for each set of candidate signal sets of information, each social score being a function of at least a trust weight value derived from the action-actor information, signal-actor information, the action-topic information and at least one trust factor selected by the first user for the other user for a topical area of interest or expertise related to the action-topic information.

2. The one or more non-transitory computer-readable mediums of claim 1, wherein each user record further includes information pertaining to at an identification of least one topical area of interest or expertise of the respective user.

3. The one or more non-transitory computer-readable mediums of claim 2, wherein each user record further includes information assembled by the respective user substantially related to the at least one topical area of interest or expertise of the respective user.

4. The one or more non-transitory computer-readable mediums of claim 1, wherein the step of exchanging information includes steps of:

determining a topical area of interest signaled by a first user;

identifying in the first user's user record one or more other users having identified an area of interest or expertise substantially related to the signaled topical area of interest and having a predetermined trust factor level pertaining to the identified area of interest or expertise substantially matching the signaled topical area of interest;

transmitting information to the first user from one or more of the identified one or more other user's records.

5. The one or more non-transitory computer-readable mediums of claim 4, wherein the step of determining a topical area of interest signaled by a user includes a step of processing language of the first user's search query to identify the topical area of interest corresponding to the first user's search query.

6. The one or more non-transitory computer-readable mediums of claim 1, wherein at least one of the candidate signal sets of information include information harvested externally from the user network.

7. The one or more non-transitory computer-readable mediums of claim 1, wherein each social score is a further function of a topical similarity score for each set of candidate signal sets of information, each topical similarity score being a derived from the action-topic information and the signal-topic information.

8. The one or more non-transitory computer-readable mediums of claim 7, wherein:
the first user set of action information further includes action-type information pertaining to a more specific sub-topic in the topic of information requested by the user;
each candidate signal set of information further includes signal-type information pertaining to a more specific sub-topic in the topic of information available to be provided by the other user; and
each social score is a further function of an item-based similarity score for each set of candidate signal sets of information, each item-based similarity score being derived from the action-type information and the signal-type information.

9. The one or more non-transitory computer-readable mediums of claim 6, wherein the step of exchanging information further includes steps of ranking the social scores for each of the candidate signal sets of information.

10. The one or more non-transitory computer-readable mediums of claim 6, wherein the trust weight value is higher when both the first user record and the other user record each include a trust factor corresponding to the other; the trust factor is lower when only one of the first user record and the other user record include a trust factor corresponding to the other; and the trust factor is even lower when neither of the first user record and the other user record include a trust factor corresponding to the other.

11. The one or more non-transitory computer-readable mediums of claim 1, wherein the instructions are further configured to harvest information external to the user network, the instructions are further configured to provide such harvested information in the exchange of information between users, and the ordering and selection of shared information includes instructions for ordering and selecting the harvested information with the shared information.

12. The one or more non-transitory computer-readable mediums of claim 1, wherein the exchange of information between users includes identities of other users in the user network having trust factors pertaining to the at least one areas of interest or expertise.

13. The one or more non-transitory computer-readable mediums of claim 1, wherein the at least one candidate signal sets of information comprises a collection of information provided by the other user.

14. The one or more non-transitory computer-readable mediums of claim 1, wherein the at least one candidate signal sets of information comprise one or more of a comment or recommendation provided by the other user.

15. The one or more non-transitory computer-readable mediums of claim 1, wherein the at least one candidate signal sets of information comprises an item contributed to at least one of the user network and another network by the other user.

16. The one or more non-transitory computer-readable mediums of claim 1, wherein:
the first user request is a search query transmitted by the first user utilizing a search engine graphical user interface provided on a computerized device networked to the user network; and
the action-topic information is derived from the user's search query.

17. The one or more non-transitory computer-readable mediums of claim 16, wherein the instructions are further configured to operate the network accessible computer system to perform the step of deriving the action-topic information from the user's search query utilizing one or more natural language processing algorithms.

18. The one or more non-transitory computer-readable mediums of claim 16, wherein the instructions are further configured to operate the network accessible computer system to perform the step of presenting search results to the search engine graphical user interface, wherein the search results are ordered, at least in part, according to social scores developed for one or more of the search results.

* * * * *

UNITED STATES PATENT AND TRADEMARK OFFICE
CERTIFICATE OF CORRECTION

PATENT NO.         : 9,607,324 B1
APPLICATION NO.    : 12/692179
DATED              : March 28, 2017
INVENTOR(S)        : Mark William Reed et al.

It is certified that error appears in the above-identified patent and that said Letters Patent is hereby corrected as shown below:

In the Claims

Column 14, Claim 1, Line 6, reads "...identity the first user,..."; which should be deleted and replaced with "...identity of the first user,....."

Column 14, Claim 2, Line 33, reads "...includes information pertaining to at an identification..."; which should be deleted and replaced with "...includes information pertaining to an identification..."

Column 15, Claim 7, Line 2, reads "...being a derived from the action-topic information..."; which should be deleted and replaced with "...being derived from the action-topic information..."

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*